(12) United States Patent
Masaoka (10) Patent No.: US 9,569,979 B2
(45) Date of Patent: Feb. 14, 2017

(54) PHYSIOLOGICAL AND COGNITIVE FEEDBACK DEVICE, SYSTEM, AND METHOD FOR EVALUATING A RESPONSE OF A USER IN AN INTERACTIVE LANGUAGE LEARNING ADVERTISEMENT

(76) Inventor: Manabu Masaoka, Rancho Palos Verdes, CA (US)

( * ) Notice: Subject to any disclaimer, the term of this patent is extended or adjusted under 35 U.S.C. 154(b) by 1424 days.

(21) Appl. No.: 12/804,519

(22) Filed: Jul. 23, 2010

(65) Prior Publication Data

US 2011/0059422 A1    Mar. 10, 2011

Related U.S. Application Data

(63) Continuation-in-part of application No. 11/567,180, filed on Dec. 5, 2006, now abandoned.

(60) Provisional application No. 60/750,394, filed on Dec. 14, 2005, provisional application No. 60/836,393, filed on Aug. 7, 2006.

(51) Int. Cl.
| | | |
|---|---|---|
| *G09B 7/04* | (2006.01) | |
| *G06Q 30/02* | (2012.01) | |
| *G09B 19/06* | (2006.01) | |

(52) U.S. Cl.
CPC ............... *G09B 7/04* (2013.01); *G06Q 30/02* (2013.01); *G09B 19/06* (2013.01)

(58) Field of Classification Search
CPC ............. G09B 5/00; G09B 7/04; G09B 19/06; G09Q 30/02

USPC .................................................. 434/156, 157
See application file for complete search history.

(56) References Cited

U.S. PATENT DOCUMENTS

| | | | | |
|---|---|---|---|---|
| 5,907,831 A * | 5/1999 | Lotvin et al. | ............... | 705/14.27 |
| 6,099,319 A * | 8/2000 | Zaltman et al. | ............... | 434/236 |
| 6,685,478 B2 * | 2/2004 | Ho et al. | ............... | 434/219 |
| 6,773,400 B2 * | 8/2004 | Njemanze | ............... | 600/454 |
| 6,778,807 B1 * | 8/2004 | Martino et al. | ............... | 434/362 |
| 7,167,822 B2 * | 1/2007 | Ueda | ............... | 704/7 |
| 2001/0034645 A1 * | 10/2001 | Tenembaum | ............... | 705/14 |
| 2002/0046087 A1 * | 4/2002 | Hey | ............... | 705/14 |
| 2003/0050928 A1 * | 3/2003 | Hays | ............... | 707/6 |
| 2003/0129571 A1 * | 7/2003 | Kim | ............... | 434/156 |
| 2003/0198921 A1 * | 10/2003 | Ueda | ............... | 434/156 |
| 2003/0208353 A1 * | 11/2003 | Ueda | ............... | 704/4 |
| 2006/0064037 A1 * | 3/2006 | Shalon et al. | ............... | 600/586 |
| 2009/0023120 A1 * | 1/2009 | Goodman et al. | ............... | 434/157 |

* cited by examiner

*Primary Examiner* — Robert J Utama (57) ABSTRACT

An embodiment is a physiological and cognitive feedback device, system, and method for evaluating a response of a user in an interactive language learning advertisement. Foreign language lessons are provided at no cost to consumers online in exchange for the consumers' feedback on the products or services embedded in the language lessons. The language lessons may use television advertisements as course material, serving both educational and promotional purposes. Revenues are generated through product placement opportunities as well as consumer survey responses that are a part of the lessons.

14 Claims, 5 Drawing Sheets

The box in dotted lines indicates the domain of the SP's website.

QUIZ 202 (It's OK to use a dictionary if necessary.)

Question 1: What does SUV stand for? (SUV is an acronym for what?) (What does SUV mean?)
Please click on your answer.

a – Super Utility Vehicle ○
b – Sports User Vehicle ○
c – Sports Utility Vehicle ○    201
d – Sports Use Vehicle ○

One-Point-Lesson: An acronym is a word composed of the first letters of the words in a phrase. An example of an acronym is IPO which is made up of the first letters of 'Initial Public Offering'. (The phrase, 'made up of' is a less formal way of saying 'composed of'.) *Translation*

Question 2: What was the interior color of the car featured in the commercial?

a – Black ○
b – Beige ○
c – Red ○
d – Fuchsia ○

Question 3: Choose the most appropriate definition of the hybrid system used in EXL.SUV 500LX a – System consisting of electrical motor(s) and an internal combustion engine ○
b – System consisting of solar panels and an internal combustion engine ○
c – System consisting of electrical motors and a diesel engine ○
d – System that can run only on ethanol ○

One-Point-Lesson: When you say, "The car can run on both gasoline and ethanol", you mean that the car can use both gasoline and ethanol as fuels. *Translation*

◁ Hybrid: an offspring of two animals or plants of different races, breeds, varieties, species, or genres *Translation*

FIG. 3

Survey Questions (about EXL SUV 500LX from EXL Motors)

Please use the following scales to indicate your rating of EXL SUV 500LX and the commercial in the video English lesson, #257. *Translation*

| 1. The car is too ugly to look at. *Translation* | ⌐ ⌐ ⌐ ⌐ ⌐ ⌐ | The car is beautiful to look at. *Translation* |
|---|---|---|
| 2. The commercial was not enjoyable. *Translation* | ⌐ ⌐ ⌐ ⌐ ⌐ ⌐ | The commercial was enjoyable. *Translation* |
| 3. I am not a big fan of the car company. *Translation* | ⌐ ⌐ ⌐ ⌐ ⌐ ⌐ | I am a big fan of the car company. *Translation* |
| 4. My friends would think I am a dork if I bought this car. *Translation* | ⌐ ⌐ ⌐ ⌐ ⌐ ⌐ | My friends would think I am cool if they saw me driving this car. *Translation* |
| 5. My significant other will probably hate this car. *Translation* | ⌐ ⌐ ⌐ ⌐ ⌐ ⌐ | My significant other will probably love this car. *Translation* |

この車を買ったら友達からダサいと思われる。

Notes:

◁ Dork: n: a dull stupid fatuous person *Translation*

◁ Cool: Slang a. adj. Excellent; first-rate: *has a cool sports car; had a cool time at the party.* *Translation* b. adj. Acceptable; satisfactory: *It's cool if you don't want to talk about it.* *Translation*

◁ My significant other: a person who is important to one's well-being; especially: a spouse or one in a similar relationship *Translation*

◁Audio pronunciations are available. Just click on the words with the ◁ mark. *Translation*

FIG. 4

PHYSIOLOGICAL AND COGNITIVE FEEDBACK DEVICE, SYSTEM, AND METHOD FOR EVALUATING A RESPONSE OF A USER IN AN INTERACTIVE LANGUAGE LEARNING ADVERTISEMENT

CROSS REFERENCE TO RELATED APPLICATIONS

The present application claims priority to and incorporates by reference in their entirety U.S. provisional patent applications Ser. No. 60/750,394 filed Dec. 14, 2005 and Ser. No. 60/836,393 filed Aug. 7, 2006; and is a Continuation-In-Part of U.S. utility patent application Ser. No. 11/567,180 filed Dec. 5, 2006, the contents of which is incorporated by reference in its entirety herein.

FIELD OF THE INVENTION

The present invention relates generally to a method and system for exchanging information. More particularly, but not by way of limitation, the present invention is a method and system for collecting marketing information from a consumer while providing a service to the consumer. Even more particularly, the present invention is a method and system to provide language lessons, e.g., English lessons, at no cost to consumers online and/or in person in exchange for the consumers' feedback on the products/services embedded in the English lessons as product/service placements.

SUMMARY OF THE INVENTION

An embodiment of the present invention is a system for exchanging information, comprising a communications network, a communications device, and a server for providing over the communications network a lesson to a user through the communications device, wherein the lesson utilizes promotional information as course material to serve an educational purpose and a promotional purpose. The system further comprises a database for storing an input from the user through a feedback device in response to an inquiry regarding the course material, wherein the feedback device is associated with a skin conductance sensor, a blood pressure sensor, a muscle activity sensor, and a deliberate selector unit, and wherein the input includes a physiological input from the user that includes data from the skin conductance sensor, the blood pressure sensor, and the muscle activity sensor. The input includes a cognitive input from the user in response to the inquiry that includes at least one datum from the deliberate selector unit. The system further includes a software engine receiving the physiological input, the cognitive input, a location of the user, and at least one personal characteristic or trait of the user, wherein the software engine identifies a physiological baseline based on an initial series of physiological inputs to establish a physiological reference point to assess a subsequent series of physiological inputs. The software engine also identifies a cognitive baseline on an initial series of cognitive inputs to establish a cognitive reference point to assess a subsequent series of cognitive inputs. The software engine generates a report comprising the physiological input from the user relative to the physiological reference point, the cognitive input from the user relative to the cognitive reference point, a location of the user, and at least one personal characteristic or trait of the user. The report provides marketing information of an effect of the promotional information on the user.

A further embodiment of the present invention is a method for exchanging information. The methodology includes registering a user wherein the registration comprises associating a location and at least one personal characteristic or trait to the user. The methodology further includes authorizing the user access to an educational service and providing, over a communications network, the educational service to the user, who is at a communications device. The educational service utilizes promotional information as course material to serve an educational purpose and a promotional purpose. Additionally, the methodology includes receiving an input from the user in response to an inquiry regarding the course material, storing the input, and generating a report comprising the input from the user, the location, and the at least one personal characteristic or trait of the user.

The communications device utilized may be a personal computer and the communications network may be the Internet. The educational service offered can be a live audiovisual presentation by an instructor of a foreign language lesson. The promotional information may be a television advertisement.

In an embodiment, the input from the user is an evaluation of a product or service in the promotional information. The input may be an audiovisual input. The user may be rewarded with redeemable points for participation in the educational service and there is no fee to the user for the educational service. In a further embodiment, there is a fee to the user for the educational service and acceptable payment for the fee comprises a non-national currency.

The report of the input from the user may be provided to an entity, e.g., the party responsible for the promotional material. In an embodiment, the entity is charged a fee for the report contingent on the number of inputs received. The report may also be customized by the entity.

DESCRIPTION OF THE INVENTION

Reference will now be made in detail to embodiments of the invention. Each example is provided by way of explanation of the invention, not as a limitation of the invention. It will be apparent to those skilled in the art that various modifications and variations can be made in the present invention without departing from the scope or spirit of the invention. For instance, features illustrated or described as part of one embodiment can be used on another embodiment to yield a still further embodiment. Thus, it is intended that the present invention cover such modifications and variations that come within the scope of the invention.

An embodiment of the present invention relates to a first entity providing information, products, and/or services to a second entity while obtaining information from the second entity. The first entity and the second entity may each be either a person, group, organization, company, etc. The information from the second entity may include, without limitation, biographical information, preferences, buying habits, likes and dislikes, opinions, etc. Communication from the first party and/or the second party may be text-based, audio-based, and/or video-based, and may be offered through any number of communication methods, such as VoIP, phone, in person, the Internet etc.

A further embodiment of the present invention enables a company to provide language (e.g., English) lessons at no cost to consumers online and/or in person in exchange for the consumers' feedback on the products/services embedded/featured in the English lessons as product placements. The term 'product placement' can be defined as the process by which manufacturers or advertisers pay a fee in order for branded products to be prominently displayed in a movie, TV show or other media production. An embodiment generates revenues by selling product placement opportunities as well as consumer survey responses that are part of the lessons, incorporated as quizzes. Each lesson may be custom-designed to describe the features of the sponsor's products/services in the language consumers would like to learn, and is presented, for example, in a conversational format as in a typical language textbook.

Figure 1A:
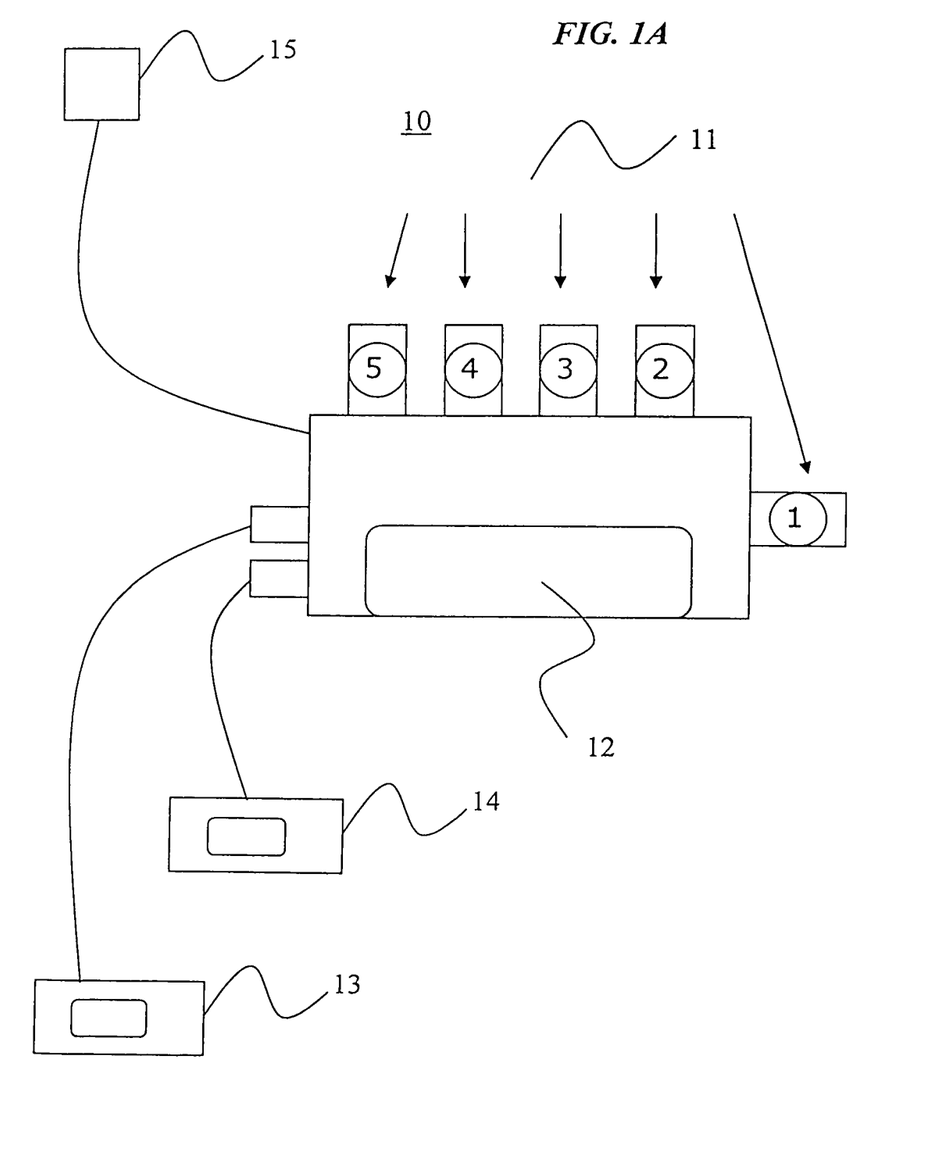
FIG. 1A illustrates an embodiment of the feedback system.

Referring to FIG. 1A, an embodiment of the present invention includes a feed back device or system, an example of which is a Feedback Handheld Device (FHD) 10. Other embodiments of the device need not be handheld, nor associated with the hand or fingers, nor portable, and can be associated or linked with any part of a living being, such as a human body. Further embodiments of the device can passively or actively receive energy or signals exiting a living being.

An embodiment of a FHD may include one, none, all, or any combination or multiples of the following features:

A) Buttons 11, for example five buttons, that may be spring-loaded or that may be touch or energy sensitive buttons that may be in constant contact with fingers or engaged by contact. These buttons may be individually identified, for example by color coding other means for identification as known in the art. These buttons may also be visually distinguishable, for example, with shapes or lighting. The lighting embodiment may be internally lit by LEDs. These buttons are a part of the deliberate selector unit which is utilized by the user to provide a cognitive input.

B) Blood pressure sensor 12, such as a built-in Blood Volume Pulse (BVP) sensor, that, for example, uses photoplethysmography to detect the blood pressure in the end part of a limb. Photoplethysmography is a process of applying a light source and measuring the light reflected by the skin. Embodiments may also include other blood or non-blood pressure sensors of a living being that are known in the art, or other physiological sensors such as those described, for example in U.S. Pat. No. 6,190,314, herein incorporated by reference.

C) Muscle activity sensor, such as a detachable Electromyogram (EMG) sensor 13. An embodiment measures the electromyographic activity of the muscle (the electrical activity produced by a muscle when it is being contracted), amplifies the signal and sends it to the encoder. Other embodiments include other sensors that detect activity of living tissue.

D) Skin conductance sensor, such as a detachable Galvanic Skin Response (GSR) sensor 14. An embodiment of the sensor measures the level of the skin's conductance. Skin conductance is a function of the sweat gland activity and the skin's pore size. When a subject feels anxiety, there will be an increase in the sweat gland activity, causing the skin's conductance to increase.

E) Encoder for converting analog signals to digital signals.

F) Attachment cord (e.g. USB connector) 15 that connects the device to a PC or other device.

G) Built-in Rechargeable battery, for example, one powered by a PC via a USB connection.

An embodiment of the feedback device or system may be utilized with a language lesson. For example, while providing an English lesson, using various study materials such as a lesson video with a product placement incorporated as part of its content, an English instructor along with a system administrator can collect feedback from lesson participants (non-native English speakers) on the various aspects of the product (e.g., sports car) featured in the lesson video. The instructor will ask the participants questions in English such as "Did you like the color of the car in the video?", "What is your favorite color?", "How much would you pay for the car?", etc. Each question, in this example, is accompanied by up to 5 multiple choices from which the participants can select their answers, using the handheld device, which is one embodiment of the present invention. The participants are to select their answers and push the button with the corresponding number on the handheld device.

To continue with this example, the system administrator can not only collect the students' responses, in other words their deliberate cognitive input, but also their vital signs or physiological data from the sensors of a biofeedback device. The cognitive input not only provides a response to a question, it also can be used to measure the knowledge, familiarity, reasoning, and other cognitive capabilities of a student (or students) and therefore establish a baseline to which other responses from the student or students can be measured.

The students' vital signs can be used to measure the level of their excitement, anxiety or lack thereof, truthfulness, etc. pertaining to the featured product, particular questions, and/or other subject matter. Likewise, the physiological input at the outset can be used to establish a baseline and thereafter relative changes that correspond to responses can be measured and interpreted.

Software or a computer program, for example, is then used to receive data from the skin conductance sensor, the blood pressure sensor, and the muscle activity sensor, as well as the cognitive input from the student. The program uses the data and identifies a physiological baseline based, for example, on an initial series of physiological inputs to establish a physiological reference point to assess a subsequent series of physiological inputs. Similarly, it identifies a cognitive baseline on an initial series of cognitive inputs to establish, for example, a cognitive reference point to assess a subsequent series of cognitive inputs.

In an embodiment, the program generates a report comprising the physiological input from a student relative to the physiological reference point, the cognitive input relative to the cognitive reference point, coupled with additional data, for example, the location of the student, and at least one personal characteristic or trait of the student.

The students and the instructor might be in the same room while some of them can participate in the session online in real time remotely via the Internet. The system administrator can also videotape the participants during the lesson, using video camera equipment installed in the venue of the lesson. If the participants accessing the lesson via the Internet have webcams on their computers, the system administrator can also capture their images and monitor and record facial and physical expressions as well for interpretation, for example, after receiving prior consent.

In a further embodiment of the present invention, a device, for example, a handheld feedback device, is collecting at least one, all, none, or any combination or multiples of the following data from the participants during an online English lesson: A) Answers to product-related questions (See example below); B) Vital signs of the participants such as heart rates, GSR signals, EMG signals, and blood pressure that are correlated with their specific answers. Such physiological data may be time coded so that one can measure what type of physiologic responses are being provided when the instructor/moderator is showing, for example, a commercial video on their computer screens.

In a typical focus group, the moderator has to wait for the participants' feedback until he/she collects survey sheets. With an embodiment of the present invention, with the feedback handheld device, the moderator/instructor can ask multiple-choice questions to the participants and receive immediate feedback via the handheld device, sending not only their answers but also their vital signs to validate the truthfulness or supplement their responses or their excitement level pertaining to certain commercial images, sounds, messages, etc.

Example

Figure 1B:
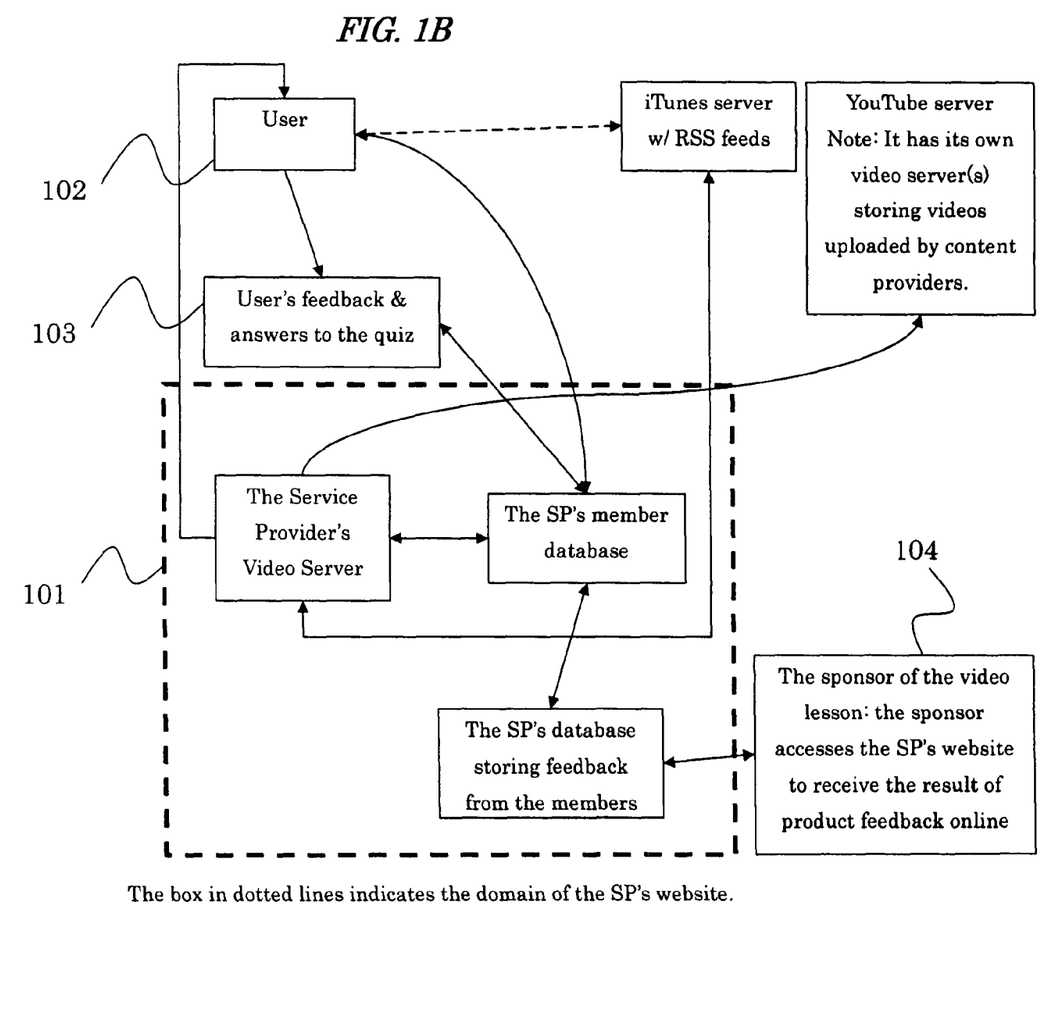
FIG. 1B illustrates an embodiment of a communication system for a video lesson.

Q1: Did you like the color of the car in the video?
A1) Yes, A2) No
Q2: What is your favorite color?"
A1) Red, A2) White, A3), Green, A4) Black, A5) Other
Q3: How much would you pay for the car?
A1) Less than $15K, A2) $15-18K, A3), $18-21K, A4)$21-25K, A5) More than $25K FIG. 1B illustrates an embodiment of a communications system for a video lesson. In the embodiment, the Service Provider (SP) 101 publishes a video language lesson on its website and feeds the video lesson to online aggregators such as iTunes. The video content is stored in the SP's video server. The SP also uploads the video lesson file to online aggregators like YouTube for them to host/store the video. A user 102 downloads the video lesson from either the SP or goes through an online aggregator. The user 102 views the video lesson and decides to become a member in order to participate in the online survey and language quiz. Within the SP's website, the user 102, now a member, provides feedback on the sponsor's product and answers to the quiz 103. He/She receives member points for the survey participation and the correct answers on the language quiz. In a further embodiment, the sponsor of the video lesson accesses the SP's website to receive the result of the product feedback online 104. There may be certain restrictions applied to the sponsor's access to the database to protect the members' privacy.

Embodiments of the present invention may include one or more of the following features:

1. For lessons via a communications network, such as the Internet, language content that is provided on a website is created by using information about the sponsors' products/services. The language content with the embedded product/service placements therefore provides a revenue source. Reliance solely on, for example, banner ads in order to generate revenues is not required.

2. The language lessons, whether be it online or in-person, may be offered free to those who wish to learn the language.

3. In an embodiment, before a person can participate in the lessons, surveys and/or quizzes, he/she must register as a member and provide a personal profile, which, in a further embodiment, can be sold to any third party for fees. This provision will be part of the membership disclaimer. Each personal profile contains information regarding his/her areas of interest such as fashion, music, movies, cars, etc.

4. The sponsors benefit from not only market exposure of their products/services to specific markets, but also receive customer feedback. Online/in-person forums, designed as a focus group/English lesson, are utilized to brainstorm for new product/service ideas for the purpose of helping the sponsors to develop well-tailored products/services while offering practical language lessons. This service may be marketed for a fee to sponsor prospects. Embodiments include providing disclaimers, notification, etc. to the student/user of the commercial/alternative basis for the lessons.

5. In a further embodiment, each online lesson follows a certain instructional format with pop-up comments for instructions on grammar, context, phrases, idioms, etc. that enable the consumers to learn a foreign language. Further embodiments may include advertisement banners or/and affiliation arrangements with third parties to generate revenues or may be run on a volunteer basis.

6. In an embodiment, all the online lessons can be a podcast. The term, 'podcast' or 'podcasting' can be defined as the method of distributing multimedia files, such as audio programs, texts, photos, and/or videos over the Internet using either the RSS or Atom syndication formats, for playback on computers and/or mobile devices such as MP3/video players, PDA devices, video game consoles, cellular phones, etc.

7. In an embodiment, every communication between the service provider (e.g., the service provider is the entity that administers the lessons and provides the conduit between the sponsor and the members) and its members represents opportunity to teach the members foreign languages while providing the sponsors with product placement and survey opportunities. And all the communication between the users and the service provider can be turned into language learning experiences whether it be online video lessons, survey questions, online chat room lessons, in-person lessons, Webcam lessons, or online written quizzes. Regardless of the forms of communication between the service provider and the users, the topic of such communication comprises/is about the features of the sponsors' products/services.

In an embodiment, the online language lessons may incorporate existing media assets of sponsors such as TV commercials, radio commercials, print advertisements, movie trailers, brochures, news clips, celebrity interviews, magazine/newspaper articles, etc. as part of the language lesson material featuring the sponsors' products/services in the media assets. For example, a video-based language lesson may use a TV commercial previously produced for a sports utility vehicle (SUV) by the manufacturer/sponsor of the car as lesson material. After the commercial video clip is shown, a language instructor appears on the screen to give a lesson based on the expressions, phrases used in the SUV commercial. (See Appendix A for a sample video lesson transcript) Each video lesson is followed by survey questions and a language quiz, both of which can be found on the service provider's website. After viewing the video lesson, the users can go to the service provider's website to first register, become a member, if they haven't done so, and then log on to participate in the survey and quiz.

In an embodiment, in order to encourage users' participation in the survey and language quiz for each video lesson, the service provider may offer incentives such as free language group/individual lessons in online chat rooms with live instructors, video lesson show transcripts, additional self-study materials (audio & video), and private online/in-person lessons, gifts, telephone lessons, etc. Every time a user provides responses to the survey and correct answers to the quiz, he/she earns member reward points, which can be redeemed to receive various member benefits, e.g., airline mileage points.

Unlike mass media advertisement, an embodiment of the present invention enables the service provider and the sponsors to identify exactly who watched the video lessons and then responded to the surveys about the products/services.

Figure 2:
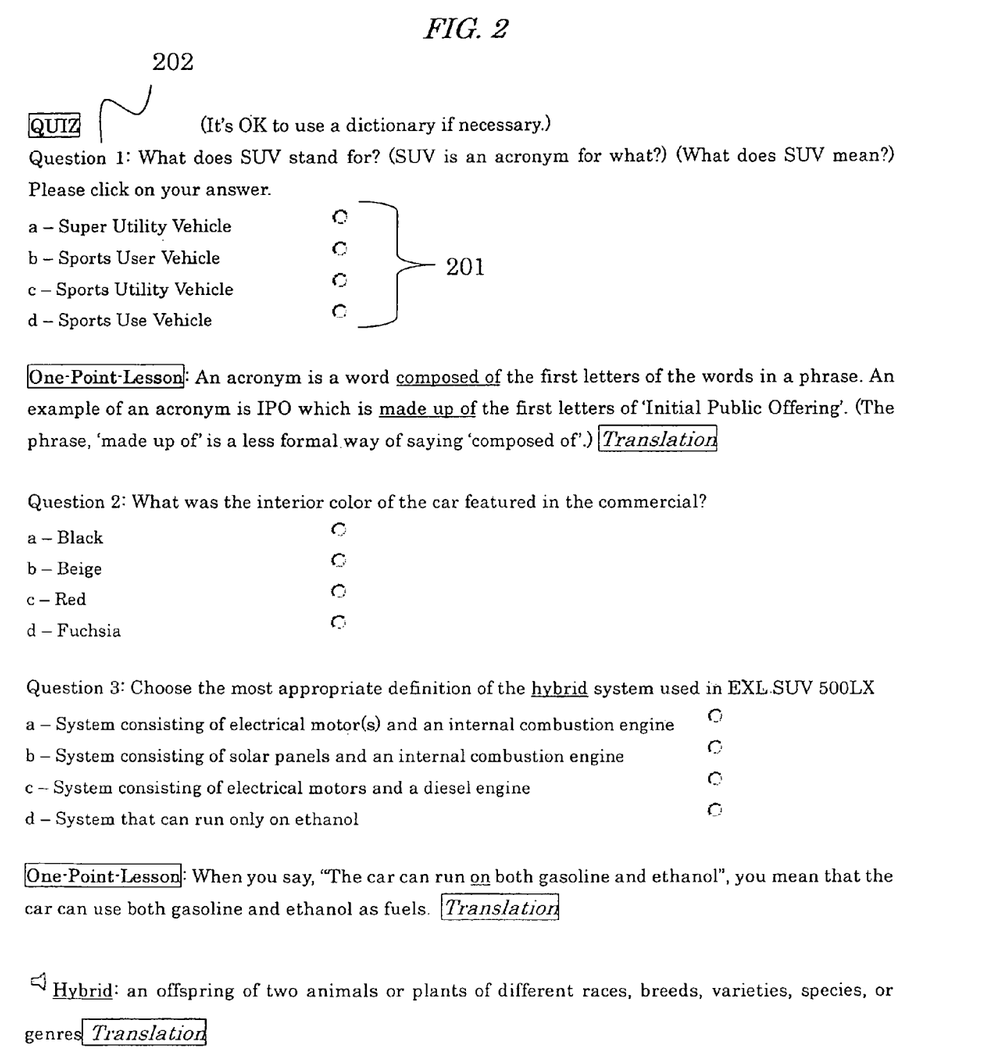
FIG. 2 illustrates an embodiment of an online survey.
Figure 3:
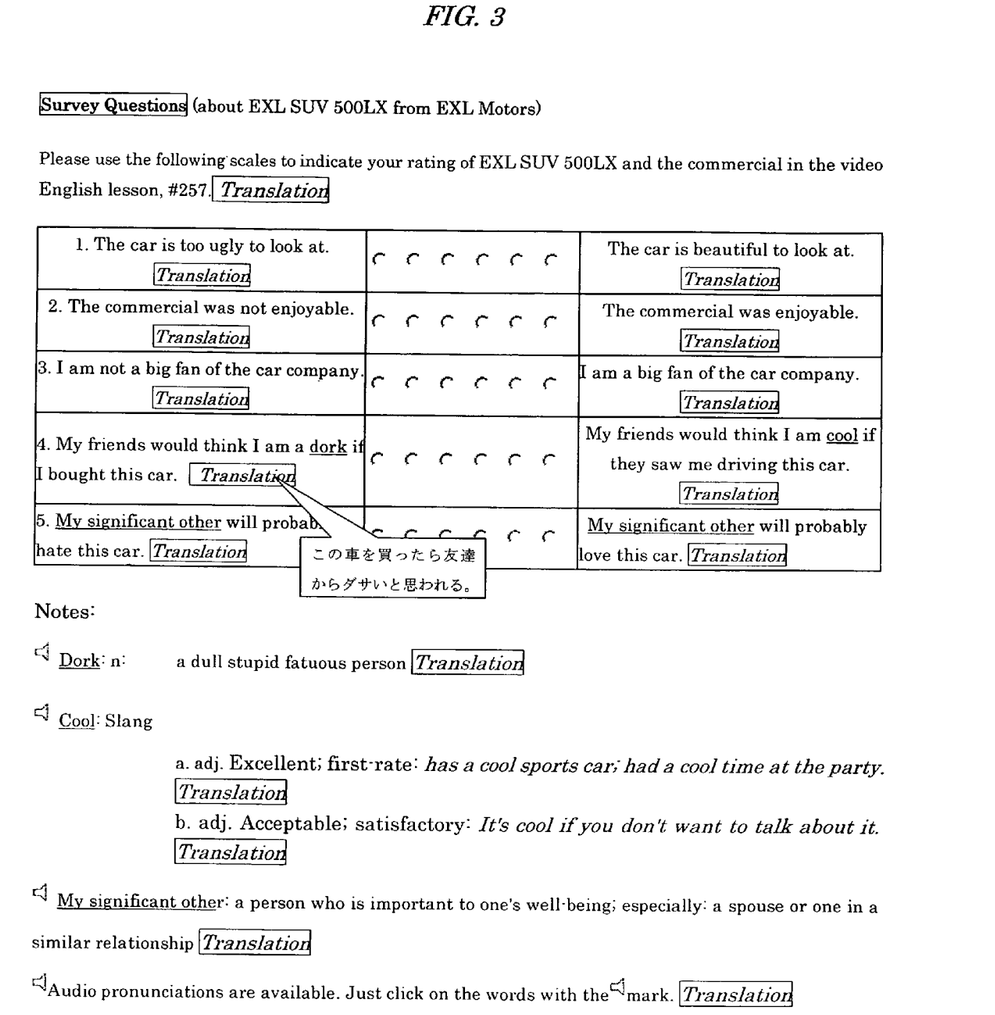
FIG. 3 illustrates an embodiment of an online quiz.

The invention also enables the service provider and the sponsors to find out the degree of attention paid to the lesson content by the viewers/users through the use of quiz questions about the featured products/services. In an embodiment, each quiz is composed of relatively easy questions about easily comprehensible aspects/features of the products/services described in the video lesson such as 'What was the color of the car interior?' This ensures that anybody with even limited English proficiency can understand so long as he/she actually watched the video and paid enough attention to it to provide a correct answer to such a question. As shown in the sample online quiz in FIG. 2, the users must pay attention to the product commercial segment of the video lesson in order to provide correct answers to the questions, thus making sure that people are not just clicking on multiple-choices to earn member reward points. In an embodiment, only correct answers to the quiz will be counted and qualify as member reward points. FIG. 3 illustrates survey questions that can be used to gauge a strength of the member's preferences.

In a further embodiment, the service provider may ask sponsors to pay only for the confirmed exposure of the featured products/services, guaranteed by the responses to the online survey and answers to the quiz received from the users. In other words, the sponsors are to pay a fee per response, the amount previously agreed upon between the sponsors and the service provider, only when responses from users are provided to the sponsors through the service provider. This revenue model may be referred to as the "cost-per-confirmed-exposure-with-response" model hereinafter. In an embodiment, the sponsors are provided with a client log-in name and password to access via the Internet to the database in which survey results are stored. The sponsors can view survey results for the video lessons they sponsored as each response is being compiled in the database system, for example, in real time or near real time. Such survey results can be sorted by various demographic criteria such as religion, gender, country, etc. and can be downloaded as electronic reports by the sponsors.

Figure 4:
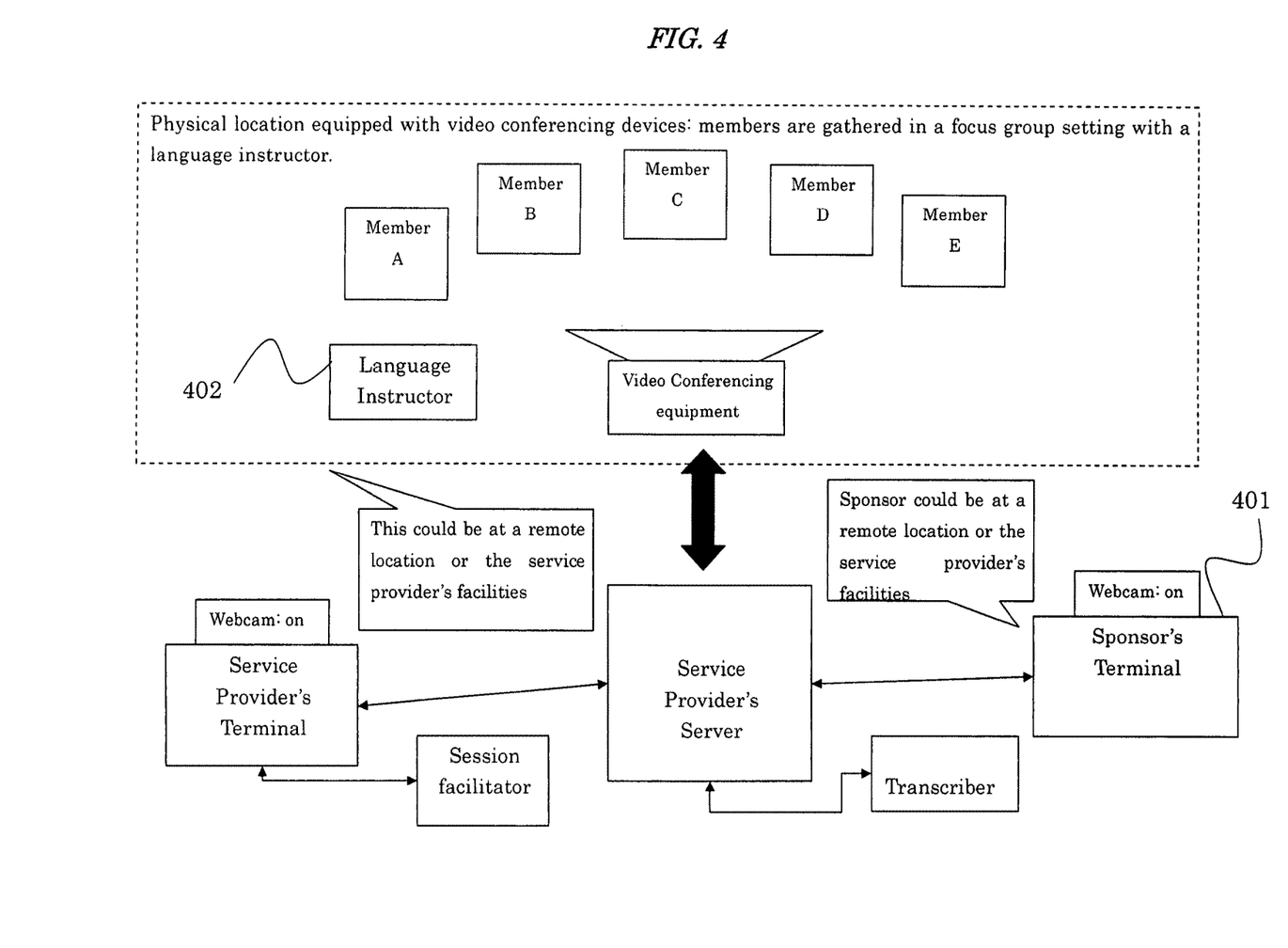
FIG. 4 illustrates an embodiment of focus group network.

In an embodiment, the same communication technique employed in the interactive language learning advertisement to turn any interaction between consumers and the service provider/sponsors into a language learning opportunity to extract and exchange important information between the parties can be used again to conduct focus group and/or brainstorming sessions. Companies in the U.S. or anywhere else can have a focus group or brainstorm with consumers/users in foreign countries. For example, referring now to FIG. 4, executives at a shoe company ("Shoe Co.") in the U.S. can view, in real time via a webcam 401, the in-person brainstorming session being conducted by a bilingual English instructor 402 in Japan with 15 college, fashion-conscious students in their 20's. Each student is asked several questions about Shoe Co.'s shoes such as: Do you like the style of these shoes? Why do you like them? What would you change about the shoes? And, in an embodiment of the invention, they must answer in English. If their answers are grammatically incorrect, the bilingual instructor will correct them so that the Shoe Co.'s executive can understand what the Japanese students are saying about the shoes while the students are learning to express their opinions in English. In a further embodiment, the responses from the students are provided in text.

In a further embodiment, each lesson has various ways to provide answers/feedback to questions pertaining to the sponsor's products/services.

In an embodiment, depending upon the type of the lesson members are taking, different type(s) of feedback data may be captured and reported to the sponsor in different formats. For example, such formats include:

1. Text-based online surveys and quizzes with multiple-choice questions pertaining to the sponsor's products/services: Collected responses (answers) along with the members profile information associated with/correlated to their responses may be compiled and formatted to the reporting specifications of the sponsor by the service provider. Refer to Appendix B for a sample information flow sequence for the survey and quiz feedback based on the video lesson.

2. Text-based online lesson with multiple-choice questions as well as written composition questions pertaining to the sponsor's products/services: In an embodiment, each written question has two spaces to write answers/responses: one for answering in English; the other for answering in the member's native language if the member is unable to articulate his/her opinions in English. This space has a title bar referred to as "What I meant to say in English is:" wherein the member can type in their native language to explain his/her opinions. The response compilation process may be the same as 1 except that the written answers, if unintelligible in English, will be grammatically corrected by a bilingual instructor using the information in the "What I meant to say in English is:" space. The members will later receive the grammatically correct version of their answers as feedback to improve their English.

3. Webcam lesson: In an embodiment, the Webcam lesson is recorded to capture the feedback from the members on the sponsor's products/services. If the members provide linguistically unintelligible answers/feedback, the bilingual instructor will not only correct the grammar but also ask the members to explain what they really meant to say in their native language. And then, the instructor may translate what they meant to say into English. In a further embodiment, there may also be a transcriber online to capture all the feedback. The sponsor may receive, e.g., the recorded video, the transcript, and a report, which is formatted and compiled to the reporting specifications of the sponsor.

4. Chat room lesson: In an embodiment, the Chat room lesson is recorded to capture the feedback from the members on the sponsor's products/services. If the members provide linguistically unintelligible answers/feedback, the bilingual instructor will correct the grammar. If the instructor is bilingual, he/she will ask the members to explain what they really meant to say in their native language. And then, the instructor may translate what they meant to say into English. In a further embodiment, there may also be a transcriber online to capture all the feedback, or the instructor may simply type the corrections in the text box within the chat room application software program. The sponsor may receive the transcript of the Chat room lesson and a report, which is formatted and compiled to the reporting specifications of the sponsor. Refer to Appendix C for a sample information flow sequence for the chat room lesson.

5. Personal Member Web Page: Each member is given a personal web page(s) where he/she can post comments in English regarding the products/services as well as the sponsoring companies, featured in the video English shows. If he/she gives permission to other members to let them make comments about his/her English in terms of grammatical mistakes and corrections on his/her web page(s), his/her web pages can be revised and updated by the other members with such permission. Also, each member can post short video and audio clips on his/her web pages, talking in English about the sponsors, their products, and/or services. All the member web pages can be viewed by authorized individuals such as language instructors, the sponsors, etc. For the purpose of extracting information such as consumer preferences and trends from the personal member web pages, data mining software applications/bots may be used to run queries. The result of such data mining queries can be compiled and reported to the sponsors for fees.

In addition to the language learning services paid for by the sponsors, based on the cost-per-confirmed-exposure model, after having established a large user base with millions of people taking the online lessons, the service provider may offer over a communications network (e.g., the Internet) other types of online learning opportunities for the members and to the public such as college level accounting, computer graphic design, architectural design, and other professional training programs for extremely small fees (hereinafter the "Premium educational services"). Taking advantage of its large member base and economy of scale, the service provider can offer many college-level or even graduate school-level courses for a fraction of the costs people would normally have to pay to enroll in similar programs elsewhere. For example, a 10-week online program in computer animation with a live instructor could be offered for $1 or lot less if there were 5 million people who signed up for the computer animation training program worldwide. The gross revenues for the service provider would be $5 million for the 10-week program, out of which the service provider will pay to the instructor of the program a base fee plus a bonus based on the final number of student enrollment in the program and feedback from the students. The service provider can hire the best teachers and experts in the world in various fields, provided that those teachers and experts would be willing to work for the opportunity to earn substantially higher teaching fees, for instance, ranging from $100,000 to $1,000,000 per program. Having such a large member base with the huge revenue potential enables the service provider to pay out significantly higher fees/salaries to the teachers, yet each member does not have to pay a very high tuition to benefit from the world-class learning experiences. Due to the large member base with people who would like to learn English as their second language, all the courses in the premium educational services can be taught in English instead of having interpreters translate English speaking experts as the course instructors.

In a further embodiment, in order to avoid high credit card transaction fees, a member can purchase credit in a lump sum amount (e.g., amount over $50) from the service provider denominated in its own unique currency (the "paracurrency") to pay for the premium educational services. It would not make good economic sense to pay a $2.50 flat fee per credit card transaction plus 1.25% of the charged amount to the credit card company when a member is only spending one dollar or less for a training program. Instead, the service provider issues and circulates its own currency within its domain in order for the members to pay for all the premium training programs. The premium training programs can be purchased only with the paracurrency. In an embodiment, payments by cash or credit cards are not accepted. Users must purchase units of the paracurrency in a lump sum, using Paypal or credit cards at a $10 increment. Each member will keep units of the paracurrency in his/her account balance. Units of the paracurrency can be purchased at a certain exchange rate. For example, 1000 units of the paracurrency can be purchased for $1US. In other words, each unit is worth 0.001 US dollar. When a member purchases $10 worth of credit, he/she will receive 10,000 units of the paracurrency. Those units are not transferable to another party and may expire at some point in the future.

These units of the paracurrency can be exchanged for member points that have been earned through the online survey and quiz participation by the member at certain exchange rates and vice versa. (e.g., 10 member points are equal to 1 unit of the paracurrency, which means that 1 member point is worth $0.0001US) Also, the paracurrency can be exchanged back into a real currency such as the US$ at a certain exchange rate, which may be different from the original rate the user purchased credit points at (usually at a significant discount between 70 and 80%) Every time units of the paracurrency are purchased by users, the service provider will set aside funds equal to 20-30% of the purchased credit to buy precious metals or gold/silver ETF's (Exchange Traded Funds). The service provider will keep such a precious metal reserve as collateral for the pre-paid credit. When the service provider issues member points to online survey participants, the company will also set aside funds equal in monetary value to purchase precious metals or gold/silver ETF's, thus maintaining financial solvency of the entire exchange system built with the paracurrency.

Embodiments of the present invention have now been described in fulfillment of the above objects. It will be appreciated that these examples are merely illustrative of the invention. Many variations and modifications will be apparent to those skilled in the art. The attached exhibits illustrate the possible architectures of a system of the present invention. The present invention also comprises computer software having instructions for implementing an embodiment of a method of the present invention. The instructions my comprise code from any computer programming language.

APPENDIX A

Sample Video Lesson Transcript

The Video Lesson Show Number: 251
Sponsor: EXL Motors
Featured Product Oracle 500LX
Host/Teacher: Jessica Andrews
(Host/Teacher Introduction)

Host/Teacher: "Welcome to our video podcast #251. Today, we are going to learn very useful English expressions about cars. As usual, we are going to watch our sponsor's 1-minute TV commercial first and come back to our language lesson. OK? And now, without further ado, here is today's featured product, the Oracle 500LX.

(Car Commercial Video Segment)

Video/Visual Effects: Oracle 500LX is at a stoplight. The driver, Steve Jobs of Apple Computer, is waiting for the green light as he notices that there is a red Porsche pulled up next to his Oracle 500LX with a Wall Street type in his early 30's in the driver seat. The Porsche driver looks at Jobs as if . . . .

Audio/Sound Effects: Steve Jobs is revving up the engine of his Oracle 500LX, but it is very quite in the vehicle.

Narration: "EXL Motors is introducing the Oracle 500LX, the first luxury hybrid SUV that can go from 0 to 60 mph in 4 seconds, but achieve 60 MPG in city driving."

Video/Visual Effects: Both Steve Jobs and the Porsche driver glance at each and turn their eyes straight ahead on the road, waiting for the traffic light to turn green.

The Porsche driver (he is speaking in his head): "Oh my god, that's Steve Jobs of Apple. I heard he is an arrogant guy. But, I can't believe he wanna race me in his SUV against my brand new Porsche."

{The Commercial Abbreviated}

(English lesson segment) Host/Teacher comes back to the screen.

Host/Teacher: "Wow, this is an amazing car! This incredibly fast car gets excellent mileage, 60 miles per gallon." "Plus, the carbon dioxide emission level of Oracle 500LX is lower than that of a sub-compact car. Perfect for the ultimate tree hugger with style! The phrase, tree huggers means people who are environmentally conscious. And now, let's talk about our first English word of the day, 'Hybrid'. The definition of the word, Hybrid is that . . . .

{The Lesson Segment Abbreviated}

Host/Teacher: "That's it for today. Be sure to check out our website, www.sozo-x.com. When you visit our website, you can earn member points by participating in our online surveys and answering English language questions. There are so many member benefits and rewards. It's all free to join in our membership program. Anyway, I hope you learned a lot about cars, especially hybrid vehicles today. Until next time, sayonara and good bye."

APPENDIX B

Sample Information Flow Sequence for the Survey and Quiz Feedback Based-on the Video Lesson (Video Lesson+User Feedback)
1. The Service Provider (the "SP") publishes/uploads a video lesson file to its video server.
2. The SP provides RSS feeds to online content aggregators such as iTunes. When online aggregators, such as YouTube, host their own video servers, storing video files created/provided by content providers, the SP uploads the video lesson to the video servers managed by such content aggregators.
3. User visits either the SP's website or an online content aggregator to download the video lesson to his/her computer and/or portable media devices. (Note: some content aggregators offer streaming videos instead of/in addition to downloadable video files.)
4. User watches the video lesson and decides to become a member to participate in the online survey about the featured product in the video lesson and provide answers to the online quiz. When a user watches the video lesson downloaded/streamed from websites or content aggregators other than the SP's website, he/she must visit the SP's website in order to participate in the online survey and the quiz. (In every video lesson, there are spiels by the host about the requirement to visit the SP's website in order to participate in the online survey and quiz. There are also visual displays within the video lesson showing the SP's website address.)
5. User visits the SP's website and goes through a registration process in which he/she provides personal information such as name, gender, date of birth, address, e-mail address, areas of interest, education level, occupation, etc, and creates a log-in name.
6. User waits for a confirmation e-mail giving him/her a temporary password, which can be changed by the member.
7. User goes back to the SP's website, logs in, and clicks on a link to the online survey and language quiz.
8. At the top of the survey questions, there is a drop-down menu from which the user can choose the country that he/she lives in. (The survey questions may change depending upon the user's residence country.)
9. There are 5-10 survey questions and 5-10 language quiz questions pertaining to the content of the video lesson (Most of the questions may be multiple-choice questions. Some surveys may have essay questions where the user can write a brief response.)
10. User submits his/her responses to the SP. The survey responses go to the member data server at the SP. Depending on the number of correct answers to the quiz and the number of survey questions answered, member award points are automatically calculated and will be added to the member's account balance.

(Note: Only one-time response per user is permitted in order to keep users from fraudulently trying to accumulate member award points by repeatedly participating in the same survey and quiz.)

11. Right after the member clicks on the submit button, he/she is directed to a webpage where the answers to the quiz questions are displayed. Within the same webpage, there is a button that the member can click on to download a transcript of the entire video lesson and some study tips saved in PDF format as well as an MP3 audio file for extra lesson and study material.
12. Survey responses are collected from many other members and are stored in the member feedback database. Every sponsor of a video lesson is given a client password and log-in name in order to access the feedback database online. The sponsors can view the results and status of the survey responses for the video lesson shows they sponsored in real time and can download an electronic report summary from the SP's website at the end of each month during the term of sponsor agreements. Such survey result data in the electronic reports can be sorted by region, country, gender, age, and other criteria.
13. The SP sends an invoice to the sponsor at the end of every month for an amount contingent upon the number of survey responses and correct answers to the quiz along with a report summarizing all the response data.

APPENDIX C

Sample Information Flow Sequence for the Chat Room Lesson Feedback Based-on the Video Lesson (Online Language Chat Room Lesson+User Feedback)
1. Member watches a certain number of video lessons to accumulate enough member reward points.
2. He/She logs in to the SP's website.
3. He/She enters his/her account page to check the member point balance.
4. There are enough points in the account balance and he/she is eligible to access the chat rooms.
5. He/She clicks on a tab, named "Chat Rooms". This will take the member to a menu/list of different chat rooms with different topics. (Topics are always about the previously distributed/podcast shows and/or products/services of the sponsors.)
6. He/She choose a chat room to join in with other members learning English from an online instructor.
7. The instructor randomly selects members and asks them a series of questions related to the features of the sponsor's product/service. All the questions are also shown in the text box within the chat application. The chat application program is also capable of accommodating voice communications between the instructor and the members.

8. When a member makes grammatical errors in responding to the instructor's question, the instructor will first type the corrections in the text box section, and then read the corrections out loud to the entire class room. (This serves two purposes: 1. to make the unintelligible English response understandable for the sponsor, 2. to help other students learn from somebody else's grammatical mistakes.) If the instructor is bilingual, he/she will provide explanations in both English and the student's native language.

9. Every written and spoken communication in the chat room lesson is captured by the service provider and is recorded in the chat room database. So that the sponsor of the chat room session can later review all the answers/responses regarding its product/service from the student members.

10. The SP compiles all the responses, written and spoken, to create an additional report to complement the online survey report.

The invention claimed is:

1. A system for exchanging information, comprising:
a communications network;
a communications device;
a server for providing over the communications network a lesson to a user through the communications device;
  wherein the lesson utilizes promotional information as course material to serve an educational purpose and a promotional purpose;
a database for storing an input from the user through a feedback device in response to an inquiry regarding the course material;
  wherein the feedback device is associated with a deliberate selector unit;
  wherein the feedback device is further associated with at least one from the group consisting of a skin conductance sensor, a blood pressure sensor, and a muscle activity sensor;
  wherein the input includes a cognitive input from the user in response to the inquiry that includes at least one datum from the deliberate selector unit;
a software engine, embodied in a non-transitory computer readable medium, receiving the input, a location of the user, and at least one personal characteristic or trait of the user;
  wherein the software engine identifies a cognitive baseline on an initial series of cognitive inputs to establish a cognitive reference point to assess a subsequent series of cognitive inputs;
  wherein the software engine generates a report comprising the cognitive input from the user relative to the cognitive reference point, a location of the user, and at least one personal characteristic or trait of the user; and
  wherein the report provides marketing information of an effect of the promotional information on the user.

2. The system of claim 1 wherein the input includes a physiological input from the user that includes data from the at least one from the group consisting of a skin conductance sensor, a blood pressure sensor, and a muscle activity sensor;
  wherein the software engine further identifies a physiological baseline based on an initial series of physiological inputs to establish a physiological reference point to assess a subsequent series of physiological inputs; and
  wherein the report generated by the software engine further comprises the physiological input from the user relative to the physiological reference point.

3. The system of claim 1 wherein the deliberate selector unit is handheld.

4. A method for exchanging information, comprising the steps of:
transmitting a lesson from a server through a communications network to a user at a communications device;
  wherein the lesson utilizes promotional information as course material to serve an educational purpose and a promotional purpose;
storing in a database an input from the user through a feedback device in response to an inquiry regarding the course material;
  wherein the feedback device is further associated with at least one from the group consisting of a skin conductance sensor, a blood pressure sensor, and a muscle activity sensor;
  wherein the input includes a cognitive input from the user using a deliberate selector unit associated with the feedback device in response to the inquiry that includes at least one datum;
receiving the cognitive input, a location of the user, and at least one personal characteristic or trait of the user;
  wherein a software engine, embodied in a non-transitory computer readable medium, identifies a cognitive baseline on an initial series of cognitive inputs to establish a cognitive reference point to assess a subsequent series of cognitive inputs;
  wherein the software engine generates a report comprising the cognitive input from the user relative to the cognitive reference point, a location of the user, and at least one personal characteristic or trait of the user; and
  wherein the report provides marketing information of an effect of the promotional information on the user.

5. The method according to claim 4 further comprising the step of:
receiving additionally the physiological input;
  wherein the physiological input from the user includes data from the at least one of the group consisting of a skin conductance sensor, a blood pressure sensor, and a muscle activity sensor; and
  wherein the software engine identifies a physiological baseline based on an initial series of physiological inputs to establish a physiological reference point to assess a subsequent series of physiological inputs; and
  wherein the report further includes the physiological input from the user relative to the physiological reference point.

6. A system for exchanging information, comprising:
a server for providing over a communications network a lesson to a user at a communications device;
  wherein the lesson utilizes promotional information as course material to serve an educational purpose and a promotional purpose;
a database for storing an input from the user through a feedback device in response to an inquiry regarding the course material; wherein the feedback device is associated with a deliberate selector unit;

wherein the feedback device is further associated with at least one from the group consisting of a skin conductance sensor, a blood pressure sensor, and a muscle activity sensor;

wherein the input includes a cognitive input from the user in response to the inquiry that includes at least one datum from the deliberate selector unit;

a software engine, embodied in a non-transitory computer readable medium, for generating a report comprising the input from the user, a location of the user, and at least one personal characteristic or trait of the user.

7. The system of claim 6 wherein the lesson is a foreign language lesson.

8. The system of claim 6 wherein the promotional material is a television commercial.

9. The system of claim 6 wherein the input from the user is an evaluation of a product or service in the lesson.

10. The system of claim 6 wherein the report is provided to an entity.

11. The system of claim 10 wherein a fee is charged to the entity for the report based on a number of inputs received.

12. The system of claim 10 wherein the report is customizable.

13. The system of claim 6 wherein the user is rewarded with redeemable points for participation in the lesson.

14. The system of claim 6 wherein the deliberate selector unit is handheld.

* * * * *